United States Patent [19]

Schiess et al.

[11] Patent Number: 4,535,633
[45] Date of Patent: Aug. 20, 1985

[54] METHOD AND APPARATUS FOR THE PROTECTION OF ANALYZERS AND OTHER SENSITIVE COMPONENTS FROM SOILING AND CORROSION

[75] Inventors: Wolfgang Schiess; Herbert Thorandt, both of Dresden, German Democratic Rep.

[73] Assignee: VEB Hochvakuum Dresden, Dresden, German Democratic Rep.

[21] Appl. No.: 620,296

[22] Filed: Jun. 13, 1984

[30] Foreign Application Priority Data

Jun. 29, 1983 [DD] German Democratic Rep. .................................. 2525158
Jun. 29, 1983 [DD] German Democratic Rep. .................................. 2525174
Jun. 29, 1983 [DD] German Democratic Rep. .................................. 2525166

[51] Int. Cl.³ .......................... G01L 7/08; G01L 9/12
[52] U.S. Cl. ........................................ 73/706; 73/702; 73/756; 55/15; 55/277
[58] Field of Search ................ 73/706, 702, 756, 726, 73/727; 55/15, 277, 270

[56] References Cited

U.S. PATENT DOCUMENTS 3,425,281  2/1969  Barz ...................................... 73/702

Primary Examiner—Donald O. Woodiel
Attorney, Agent, or Firm—Jordan and Hamburg

[57] ABSTRACT

A method and an apparatus which, when interposed or integrated into sensitive pressure analyzers of pressure and vacuum measuring engineering equipment, prevent the intrusion of corrosive or condensable gases, or vapors, into the inside of the analyzer, and hold back soiling (dust and dirt) particles contained in gaseous measuring media. The present development contemplates a low-frequency oscillating diaphragm body, disposed inside of a pressure, or vacuum sealed, duct housing, in such a way, that although it optically diametrically blocks the light tube connection, it allows static pressure compensation via one or several bypass boreholes; it forces, by its energy of motion, directly impinging soiling dust and dirt particles, and gas or vapor molecules, to change their original direction of motion. The present protection arrangement is utilizable not only in pressure ranges above atmospheric pressure, but also in vacuum up to an absolute pressure of <10 Pa. It can be utilized as a separate component, but it can also be integrated into analyzers, especially into modulation analyzers. The protection method and apparatus safeguards the continued and linear measurement of gas pressure over a great measuring range.

20 Claims, 2 Drawing Figures

METHOD AND APPARATUS FOR THE PROTECTION OF ANALYZERS AND OTHER SENSITIVE COMPONENTS FROM SOILING AND CORROSION

BACKGROUND OF THE INVENTION AND PRIOR ART STATEMENT

The invention concerns a method and an apparatus, which, in pressure and vacuum measuring engineering equipment, prevent the intrusion of corrosive or condensable gases, or vapors, into the inside of connected components, and inhibit impurities contained in a gaseous measuring medium, without thereby reducing the function, such as, for instance, the measuring accuracy or the measuring range, of connected components and analyzers.

In manometry, it is known that by means of controlled flow-through throttling of a constant protective gas flow into the measuring lines, the intrusion of corrosive or soiled gases and vapors containing entrained dust and dirt particles into the measuring element can be avoided.

Rinsing of measuring lines for protection against corrosive media and against dust and dirt entry however, requires a steady supply of protective gas, and leads, especially at low pressures, to measuring errors.

For the protection of diaphragm-vacuum measuring instruments, there is further known a gas rinse flange, whereby, via a fine jet, a protective gas current of approximately 200 Pa l/s flows in such a way into the flange interpolated between the measuring instrument and the recipient, that the protective gas stream, in the direction to the recipient, is as great as the occurring diffusional flow of undesired vapors in the opposite direction.

The utilization of a gas rinse flange in the appropriate vacuum range has the disadvantage, however that in addition to the protective gas, a higher suctioning capability of the vacuum pump, for instance of 5 $m^3h^{-1}$ is required for pumping out to approximately 100 Pa. Furthermore, the protection is only effective up to approximately 40 kPa absolute pressure; over and above this limit, the instrument has to be shut off from the apparatus by an additional valve.

For the protection of vacuum analyzers from harmful condensable gases and vapors, there is also known the interpolation of a low-temperature trap, which is filled with liquid nitrogen (freezing pocket, baffle). Interpolated freezing traps in front of the compression vacuum measuring instruments should also prevent the intrusion of mercury vapor out of the measuring instrument itself and into the recipient.

When freezing traps are used, in addition to the required constant monitoring and replenishing with the expensive liquid nitrogen, there also have to be calculated additional measuring errors, because only the portion of the non-condensable gases and vapors of the measuring media are measured.

Furthermore, by using compression-vacuum measuring instruments at low absolute pressures, values reduced by about 40% are measured, because the mercury vapor which leaks out of the measuring liquid and flows into the cooling trap repels a portion of the gas molecules from the recipient, which thus escapes measuring.

It has been attempted to reduce the diffusion of propellent vapors into the mechanical prevacuum pump in diffusion pumps of high-vacuum engineering by interpolating, for instance, water cooled refrigeration sections or refrigeration traps. But this has proved itself insufficiently effective, for instance in pumping stations for the evacuation of picture tube flasks.

It is also known that intrusion of mechanical impurities into analyzers, for instance during intake of atmospheric air, is usually reduced by filters made of fine meshed metal sieves, or sintered pore filters (bronze or glass) or felt, whereas for protection against vapor deposits on cold cathode-vacuum analyzers, deflection plates are used, which prevent the rectilinear diffusion of vapor particles, and which should protect against dust and dirt entry.

The pore filters, however, can only protect the analyzers against coarse impurities, and have to be changed or cleaned after prolonged usage, because otherwise the measurements will be inaccurate, due to the strong throttling of the line cross section.

Deflection plates for protection against vapor deposits are also only of limited effectiveness, mainly because they do not reduce the necessity of frequent cleaning of cold cathode-vacuum analyzers.

SUMMARY OF THE INVENTION

It is an object of the invention to protect sensitive components and analyzers from damaging gas impurities, to prolong the life of sensitive components and analyzers, and to avoid maintenance.

Another object of the invention lies in creating a method and an apparatus which provide effective protection of sensitive pressure analyzers from entry of dust and dirt, from attack of corrosive gases and vapors, or the condensation of condensable particles, without thereby affecting the continuous measuring of gas pressures and the reliable indication of the gas pressure over a great measuring range.

A further object is to prevent the intrusion of mercury, oil vapors, in diffusion high-vacuum pumps, into the suctioning side of prevacuum pumps; and in the configuration between recipient and compression vacuum measuring instruments, the mercury diffusion being in the direction of the recipient.

An additional object is to provide a method and an apparatus which, when interposed or integrated into sensitive pressure analyzers of pressure and vacuum measuring engineering equipment, prevent the intrusion of corrosive or condensable gases, or vapors, into the inside of the analyzer, and hold back soiling (dust and dirt) particles contained in gaseous measuring media.

Still another object is to safeguard the continued and linear measurement of gas pressure over a great measuring range.

According to the invention, the problem is solved in the following way. It has been ascertained that through its energy of motion, a low-frequency osciallating diaphragm body forces directly impinging dust and dirt particles, and gas or vapor molecules, to change their original path of motion. For this purpose, the oscillatable diaphragm body is made to oscillate by an electric or electromechanical drive in periodic low-frequencies of, for instance, net frequency. Thereby a sinusoidal alternating pressure usually results, which superimposes itself on the existing gas pressure of the equipment. By the periodic movement of the diaphragm body, the so-called alternating pressure transmitter, kinetic energy is transmitted to the dust and dirt particles which are flowing in the measuring medium to the analyzer, which forces these particles in the opposite direction, whereby their intrusion into the sensitive analyzer is avoided.

Through the movement of the oscillatable diaphragm body, there results a short-term compression of the gas volume in the environment, and, concurrent with it, the alternating pressure is $$p = [(\Delta V)/V] \cdot p_{absolute}$$

This alternating pressure in the range of higher gas density is identical with the sound pressure, not only at excess pressure, but also at approximate vacuum. By the periodical, short-term alternating pressure, a preferred movement of the gas particles in the direction away from the components which are to be protected is produced, which is greater than the occurring diffusion stream of the undesired vapors in the opposite direction. Because of the sensitivity of human hearing, the applied alternate-current voltage of preferably net frequency or other is suitably 1 kHz removed from the audio frequency, and has to be adjusted in such a way, that the resulting alterating pressure level (sound pressure level) is a minimum of 100 dB at atmospheric pressure on the inside of the tube. Thereby, even at low absolute pressure in the vacuum equipment, there is sufficient protection, because the resulting alternating pressure level depends directly on the magnitude of the absolute pressure.

The apparatus for carrying out the method of the invention is located in a housing between the component to be protected and the volume of the apparatus, and consists of an alternating pressure transmitter system which is elastically suspended between rings and is held in position by them. The metal diaphragm(s) of the alternating pressure transmitter system is (are) provided with drives and their electrical flexible lines lead via vacuum sealed pressure glass ducts to the outside. The alternating pressure transmitter system is positioned in the housing so that rectilinear access of gas and vapor molecules into the inside of the components, which have to be protected, is avoided by the clamping ring. This access is realized by bypass boreholes positioned in the centering ring, as well as the ring slot, which is formed by the alternating pressure transmitter system and the housing which encloses it. The apparatus can be utilized as an independent component, or it can be integrated into analyzers, especially modulation analyzers. It thereby becomes a component of the analyzer, and at the same time takes over important functions thereof.

At installation of the apparatus in analyzers of this kind, the metal diaphragm existing in the analyzer (in the additional transmitter diaphragm) is disposed at a distance of several mm from the metal diaphragm of the device, and is also suspended in position by the centering ring, whereby both metal diaphragms are suspended so that they can oscillate freely, and so that they each support, on the sides facing each other, an electromechanical driving system.

The metal diaphragm of the apparatus is arranged so that it exerts an opposite recoil in amplitude and phase position on the receiver transmitter of the analyzer. The effect of the produced alternating pressure on the receiver is thereby negligibly small. The metal diaphragm of the apparatus therefore acts as a compensator. The alternate-current voltage for the operation of both diaphragms is thereby taken from the same generator, and is supplied in equal magnitude to each analyzer.

The tightening ring, which in cooperation with the centering ring holds the transmitter diaphragm in position, is oscillation dampingly connected by an elastic adhesive bond with the diaphragm ring of the receiver transmitter of the analyzer.

The advantages of the proposed solution lie, besides the simplified construction, in the reduction of the cost of the equipment, and above all therein, that because of the identical construction of both diaphragms, identical temperature dependency is given, and both diaphragms always oscillate at the same frequency. By a one time setting of a respective voltage divider, the sensitivity of the transmitter system is set at a point within the linear measuring range, for instance to 1 kPa, and the amplitude of the compensator to the end of the measuring range, for instance to 1 kPa. The setting for the compensator is selected so that the practical occurring recoil amplitude on the transmitter is compensated, so that the recoil compensation is achieved without additional transmitters, or electrical controls, so that the modulation chamber is protected against dust and dirt entry, and so that the interchangeability of the analyzers is guaranteed.

The apparatus is utilizable not only in pressure ranges above atmospheric pressure, but also in vacuum up to an absolute pressure of $< 10$ Pa.

In the application of the invention for the protection of vacuum analyzers, where the functioning principles require the evaluation of alternating magnitudes, as for instance with friction, or various other heat transmission vacuum measuring devices, for operating the apparatus according to the invention, it is necessary to select a distinctly different driving frequency from the selected oscillating or evaluation frequency of the mentioned instruments.

Reversely installed, the apparatus configured as a separate component can be used, as in the application of MacLeod compression vacuum measuring instruments, to prevent the mercury return flow into the vacuum equipment, and to prevent its accompanying measurement errors.

An application outside of pressure measuring engineering is the reduction of undesired return flow of the propellant of diffusion vacuum pumps, in the suctioning stroke stream of the required mechanical prevacuum pumps.

BRIEF DESCRIPTION OF THE DRAWINGS

The invention is further explained by the exemplified enclosed two illustrations of the embodiment.

The accompanying drawings show the following.

DETAILED DESCRIPTION OF THE PREFERRED EMBODIMENTS

Figure 1:
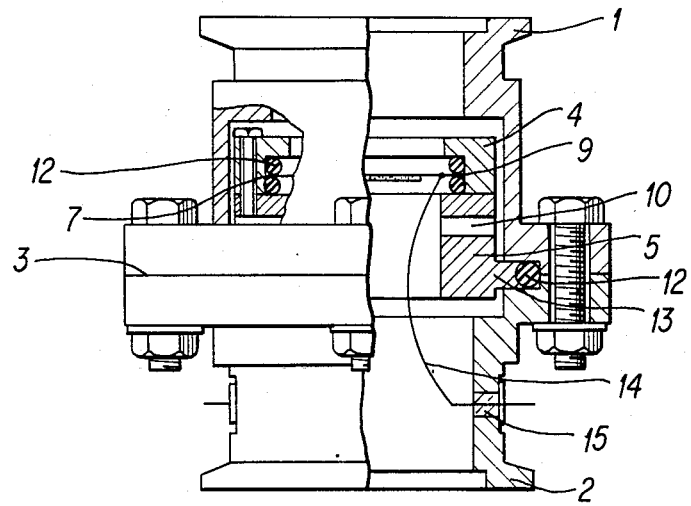
FIG. 1: The cross-sectional representation of the apparatus of the invention as a separate component.

Following is a glossary of elements, members and terms employed in the present invention.

GLOSSARY

1. Vacuum flange
2. Analyzer flange
3. Housing
4. Clamping ring

5. Centering ring
6. Tightening ring
7. Metal diaphragm (compensator)
8. Metal diaphragm (transmitter diaphragm)
9. Piezoceramic plate
10. Bypass borehole
11. Equilibration opening
12. Circular ring
13. Collar
14. Flexible electrical lead wire
15. Vacuum sealed pressure glass duct
16. Diaphragm ring
17. Condenser transmitter
18. Modulation chamber The present invention basically entails the provision of a method for the protection of analyzers and other sensitive components in pressure and vacuum measuring engineering equipment from soiling (dust and dirt entry) and corrosion, in which, between the part to be protected and the vacuum equipment, inside of a housing, there is disposed an alternating pressure transmitter system, which produces in its environment an alternating pressure, whereby the applied alternate-current voltage is selected in such a way, that the resulting sound level at the connected, and to be protected, part on the conception flange of the pressure and vacuum equipment, is a minimum of 100 dB at atmospheric pressure. In a typical embodiment, for the protection of pressure and vacuum measuring elements, preferably an operating frequency between 50 and 400 Hz is selected, for the case of efficient utilization of an alternate-current voltage magnitude, as a measurement for the existing pressure; however, an operating frequency which varies from the frequency required for the element is selected. Generally, the alternate-current voltage for the operation of an additional diaphragm body, in an application of the method in a modulation vacuum analyzer, for instance at 1 Pa absolute pressure, is set in such a way, that the recoil effect on the transmitter diaphragm, which is disposed over the transmitter and the metal diaphragm, oscillating in opposing phases, compensate their effect on the condenser transmitter.

The apparatus aspect of the present invention is characterized by the provision of elements and members to accomplish the described method, and which includes an alternating pressure transmitter system inside of a housing (3). The system includes at least one elastically suspended diaphragm body(ies) (7,8) suspended between circular rings (4, 5, 6); on the diaphragm body(ies) are secured flexible electrical lead wires (14), which lead via vacuum sealed pressure glass ducts (15) to the outside for applying an alternate-current voltage, and the diaphragm body(ies) (7, 8) are provided with electromechanical drives (9), preferably with conductively adhesivebonded piezoceramic plates. Typically, the housing (3) consists of a vacuum flange (1) and an analyzer flange (2), in which, in a bore of the vacuum flange (1), a clamping ring (4) is easily separably connected with a centering ring (5), and between both rings (4, 5), a metal diaphragm (7) having an electromechanical drive (9), is suspended, for instance, between circular rings (12), and the centering ring (5) is provided with a collar (13) with a circular ring (12), which is clamped fixedly by the halves of the housing (1, 2). Alternately, the housing (3) consists of a vacuum flange (1), in which between a clamping ring (4), a centering ring (5) and a tightening ring (6), there are two metal diaphragms (7, 8) having electromechanical drives (9) which are freely movable, and which are sealed by a thin layer of silicone lubrication film, and which are mirror-symmetrically, and at a distance of several mm, disposed towards each other, both metal diaphragms (7, 8) are mutually exchangeable, and are connected for the supply of an alternate-current voltage of equal frequency with a common generator.

Generally, bypass boreholes 10 are provided in the centering ring (5). Also, usually the tightening ring (6) is connected by an elastic adhesive bond with the diaphragm ring (16) of the condenser transmitter (17), and the conventional modulation chamber (18) is formed by the diaphragm of the condenser transmitter (17), the transmitter diaphragm (8) and the tightening ring (6), and it is connected with the gas pressure to be measured by an equilibration opening (11), which is preferably disposed in the transmitter diaphragm (8). In most cases, the apparatus is installed and operated in the reverse preferred installation position.

Referring now to the drawings, FIG. 1 shows a two-piece housing 3 consisting of a vacuum flange 1 and an analyzer flange 2, wherein at a small distance from the inner wall, and in a recess of the vacuum flange 1, a clamping ring 4 is positioned. This clamping ring 4 also has a cylindrical recess, in which the alternating pressure transmitter, consisting of the metal diaphragm 7, and the conductively adhesive-bonded piezoceramic plate 9, is elastically clamped between the circular rings 12. By means of the centering ring 5, the circular rings 12 are fastened in the recess of the clamping ring 4, whereby the clamping ring 4 is connected with the centering ring 5, by means of cylinder head cap screws.

The centering ring 5 has on its outer diameter a collar 13, on which is positioned a circular ring 12, which is clamped together with the collar 13, between the halves of the housing 1 and 2, whereby the entire system is held into position.

Furthermore, the centering ring 5 is equipped with bypass boreholes 10, which serve for the static pressure compensation of the system. The flexible electrical lead wires 14 positioned on the alternating pressure transmitter 7, 9 lead via the vacuum sealed pressure glass duct 15, positioned in the analyzer flange 2, to the outside, for applying the alternate-current voltage, which, in the example of the embodiment, is 10 to 15 V at a frequency of 50 to 400 Hz.

Figure 2:
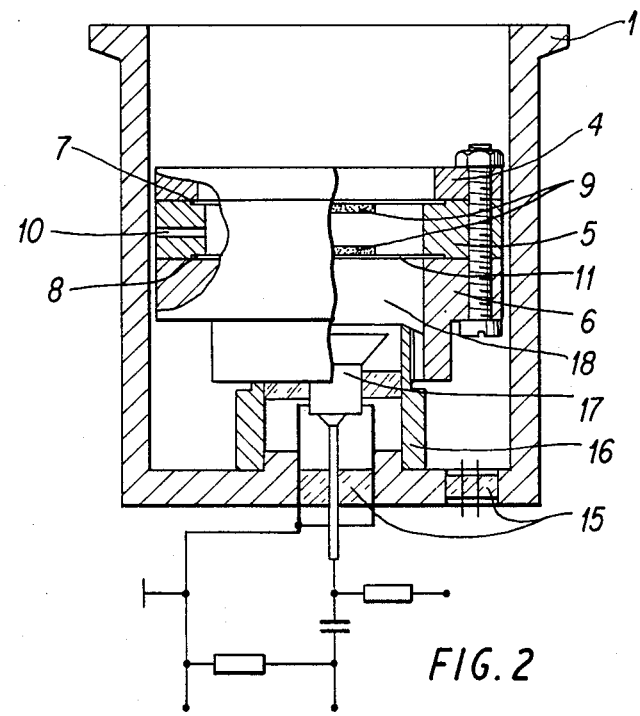
FIG. 2: the cross-sectional representation of the apparatus of the invention integrated into an analyzer.

In the exemplified embodiment of FIG. 2, the housing 3 consists only of vacuum flange 1, wherein, also at a small distance from the inner diameter of the vacuum flange 1, can be recognized the clamping ring 4; on the frontal area thereof, facing the analyzer, is connected the metal diaphragm 7 with the conductively adhesive-bonded piezoceramic plate 9.

The metal diaphragm 7, as well as also the metal diaphragm 8 of the alternating pressure transmitter of the analyzer, are fixed into position by means of the frontal grooves in the centering ring 5. The sealing of the metal diaphragms 7, 8 is provided by their positioning in a thin layer of silicone lubrication film. The metal diaphragm 8 of the transmitter is further fastened by the tightening ring 6 in the groove of the centering ring 5.

The clamping ring 4, the centering ring 5 and the tightening ring 6 are held together by screws. The tightening ring 6 is fastened on its side on the diaphragm ring 16 of the condenser transmitter 17 by means of an elastic adhesive bond. The housing of the condenser transmitter 17 itself is disposed on the base of the vacuum flange 1, as are the vacuum sealed pressure glass ducts 15, via which the flexible electrical lead wires 14 for the drive of the metal diaphragms 7,8 lead to the inside, as well as the lines for the connection of the electronic indicator unit for the indication of the pressure to be measured.

In the centering ring 5 is disposed the bypass borehole 10. The equilibration borehole 11 takes care of the production of the steady static pressure compensation with the gas pressure, which has to be measured in the modulation chamber 18, consisting of the transmitter diaphragm 8, the tightening ring 6 and the diaphragm of the condenser transmitter 17. The equilibrating opening 11 which is disposed in the transmitter diaphragm 8 of the exemplified embodiment, can also lead into the modulation chamber 18 as a randomly shaped equilibrating opening of a smaller cross section.

The apparatus thereby operates in the following way: Due to the low-frequency alternate-current voltage, there results, on the piezoceramic plates 9, periodical longitudinal changes, which, via the adhesive bond with the oscillatingly suspended diaphragms 7, 8, lead to the deflection of the latter. Thereby the transmitter diaphragm 8 produces a relatively high periodical volume change in the modulation chamber 18, which leads to an alternating pressure, which superimposes itself sinusoidally upon the absolute pressure. The alternating pressure received from the condenser transmitter 17 is directly dependent on the absolute pressure in the vacuum equipment. Therefore the alternate-current voltage derived from the electronic indicator unit is an indication of the absolute pressure which has to be measured.

Although the metal diaphragm 7 also produces an alternating pressure, its effect upon the pressure in the modulation chamber 18, and therefore on the condenser transmitter 17, is negligibly small, because it is effective upon a substantially greater volume.

Not only the transmitter diaphragm 8, but also the metal diaphragm 7, concurrently produce a recoil, which, without counter measures, would act upon the sensitive condenser transmitter 17 as undesirable sound conducted through solids, and at low pressure would produce a greater alternate-current voltage than the desired alternating pressure in the modulation chamber 18.

Because both diaphragms 7, 8 are identical, possess the same temperature dependency and are installed and activated in such a way that the recoil is effective in opposite directions, the magnitude of the recoil on the metal diaphragm 7 at low absolute pressure (for instance 1 Pa), at the end of the measuring range, can be regulated in such a way, by setting of the applied low-frequency alternate-current voltage, that the concurrently effective recoil of the transmitter diaphragm 8 is compensated.

Thereby the undesirable influence of the recoil on the measuring results is eliminated by simple constructive means. Through the low-frequency oscillations of the metal diaphragm 7, it is therefore achieved that the surrounding gas molecules, and the particles contained in the gas, receive such kinetic energy that impurities, oil droplets and steam particles, as already described in the explanation, are held back.

Rectilinear intrusion of gases and vapors containing impurities or corrosive components into the analyzers, or components to be protected, is prevented, or at least severely limited, according to both exemplified embodiments, by the configuration of the direction of the gas flow via the ring slit, the bypass borehole 10, as well as the equilibration opening 11 of the modulation chamber 18.

In summary, the present invention entails the provision of a method and apparatus which, when interposed or integrated into sensitive pressure analyzers of pressure and vacuum measuring engineering equipment, prevent the intrusion of corrosive or condensable gases, or vapors, into the inside of the analyzer, and hold back soiling (dust and dirt) particles contained in gaseous measuring media. The present development contemplates a low-frequency oscillating diaphragm body, disposed inside of a pressure, or vacuum sealed, duct housing, in such a way, that although it optically diametrically blocks the light tube connection, it allows static pressure compensation via one or several bypass boreholes; it forces, by its energy of motion, directly impinging soiling dust and dirt particles, and gas or vapor molecules, to change their original direction of motion. The present protection arrangement is utilizable not only in pressure ranges above atmospheric pressure, but also in vacuum up to an absolute pressure of $<10$ Pa. It can be utilized as a separate component, but it can also be integrated into analyzers, especially into modulation analyzers. The protection method and apparatus safeguards the continued and linear measurement of gas pressure over a great measuring range.

It thus will be seen that there is provided a method and apparatus for the protection of analyzers and other sensitive components from soiling and corrosion which attains the various objects of the invention, and which is well adapted to meet the conditions of practical use. As numerous alternatives within the scope of the present invention will occur to those skilled in the art, besides those alternatives, equivalents, embodiments and variations mentioned supra and shown in the drawings, it will be understood that the present invention extends fully to all such equivalents and the like, and is to be limited only by the scope of the appended claims, and functional and structural equivalents thereof, especially with regard to the various elements, members and terms employed supra in elucidating the invention.

We claim:

1. A method for the protection of a sensitive device by prevention of the intrusion of a deleterious component into the inside of said sensitive device via transfer or measurement connection member, which comprises interposing into said connection member a low-frequency oscillatable diaphragm element, oscillating said diaphragm element in periodic low operating frequency between about 50 and 400 Hz at about 10 to 15 V, so that said diaphragm element comprises an alternating pressure transmitter system which produces an alternating pressure in the environment of said connection member, the resulting sound level in the environment of said connection member being at least 100 dB at atmospheric pressure; whereby, by the periodic movement of said diaphragm element, kinetic energy is transmitted to said deleterious component, thereby forcing said deleterious component in an opposite direction relative to said sensitive device, whereby the intrusion of said deleterious component into said sensitive device is prevented.

2. The method of claim 1, in which the oscillatable, diaphragm element is oscillated by an electric or electromechanical drive in periodic low frequencies.

3. The method of claim 1, in which the alternating pressure in the environment of the connection member is a sinusoidal alternating pressure.

4. The method of claim 3, in which the sinusoidal alternating pressure superimposes itself on the existing fluid pressure in the environment of the connection member.

5. The method of claim 1, in which the sensitive device is a measuring or analyzing instrument.

6. The method of claim 1, in which the pressure range in the connection member is above atmospheric pressure.

7. The method of claim 1, in which the pressure range in the connection member is in vacuum up to an absolute pressure of <10 Pa.

8. The method of claim 1, in which the deleterious component is selected from the group consisting of a corrosive gas, a corrosive vapor, dust particles, dirt particles, a condensate or condensable vapor, mercury vapor, mechanical impurities, oil vapor and steam.

9. The method of claim 1, in which the sensitive device is a modulation vacuum analyzer, an additional second oscillatable diaphragm element is interposed, the alternate current voltage for the operation of said second diaphragm element being such, that the recoil effect on the originally interposed low-frequency oscillatable diaphragm element compensates its effect, by the respective diaphragm elements oscillating in opposing phases.

10. The emthod of claim 9, in which the modulation vacuum analyzer functions at about 1 Pa absolute pressure.

11. The method of claim 1, in which the diaphragm element comprises a metal diaphragm.

12. An apparatus for the protection of a sensitive device by prevention of the intrusion of a deleterious component into the inside of said sensitive device which comprises a sensitive device, a gas-containing transfer or measurement connection member, said connection member extending to the inside of said sensitive device and containing a low frequency oscillatable diaphragm element, said diaphragm element comprising an alternating pressure transmitter system, means to oscillate said diaphragm element in periodic low operating frequency, so that said diaphragm element produces an alternating pressure in the environment of said connection member by periodic movement, so as to transmit kinetic energy to the gaseous phase in said connection member, whereby kinetic energy is transmitted to any deleterious component in said gaseous phase, thereby forcing said deleterious component in an opposite direction relative to said sensitive device, so that the intrusion of said deleterious component into said sensitive device is prevented.

13. The apparatus of claim 12, in which the oscillatable diaphragm element is oscillated by an electric or electromechanical drive.

14. The apparatus of claim 12, in which the sensitive device is a measuring or analyzing instrument.

15. The apparatus of claim 12, in which the sensitive device is a modulation vacuum analyzer, together with an additional second oscillatable diaphragm element, said second diaphragm element being interposed adjacent said low frequency oscillatable diaphragm element, and means to impress an alternate-current voltage for the operation of said second diaphragm element, whereby the recoil effect on the originally interposed low-frequency oscillatable diaphragm element compensates its effect, to thereby oscillate the respective diaphragm elements in opposing phases.

16. The apparatus of claim 12, in which the diaphragm element comprises a metal diaphragm.

17. The apparatus of claim 12, in which the alternating pressure transmitter system comprises at least one elastically suspended low frequency oscillatable diaphragm element, said diaphragm element being suspended between circular rings, an electromechanical drive means to drive and oscillate said diaphragm element, with conductively adhesive-bonded piezoceramic plates.

18. The apparatus of claim 17, in which the alternating pressure transmitter system includes a housing, said housing including a vacuum flange and an analyzer flange, together with a clamping ring in a bore of said vacuum flange, said clamping ring being separably connected with a centering ring; the diaphragm element having an electromechanical drive being suspended between said clamping ring and said centering ring and between the circular rings, said centering ring being provided with a collar member.

19. The apparatus of claim 17, in which the alternating pressure transmitter system includes a housing, said housing including a vacuum flange, together with two metal diaphragm elements, said elements being freely movable and having electromechanical drives, said two metal diaphragm elements being disposed between a clamping ring, a centering ring, and a tightening ring, said two freely movable metal diaphragm elements being sealed by a thin layer of silicone lubrication film, said two diaphragm elements being mirror-symmetrically disposed towards each other and spaced from each other at a distance of about several mm, both of said two diaphragm elements being mutually exchangeable and being connected for the supply of an alternate-current voltage of equal frequency, with a common generator.

20. The apparatus of claim 19, in which the alternating pressure transmitter system includes a condenser transmitter, the tightening ring is connected by an elastic adhesive bond with a diaphragm ring of said condenser transmitter, a modulation chamber is formed by said diaphragm ring together with the transmitter diaphragm and the tightening ring, said modulation chamber being connected with the gas pressure of the connection member, the gas pressure to be measured by the sensitive device, by an equilibration opening in said transmitter diaphragm.

\* \* \* \* \*